Figure 1:
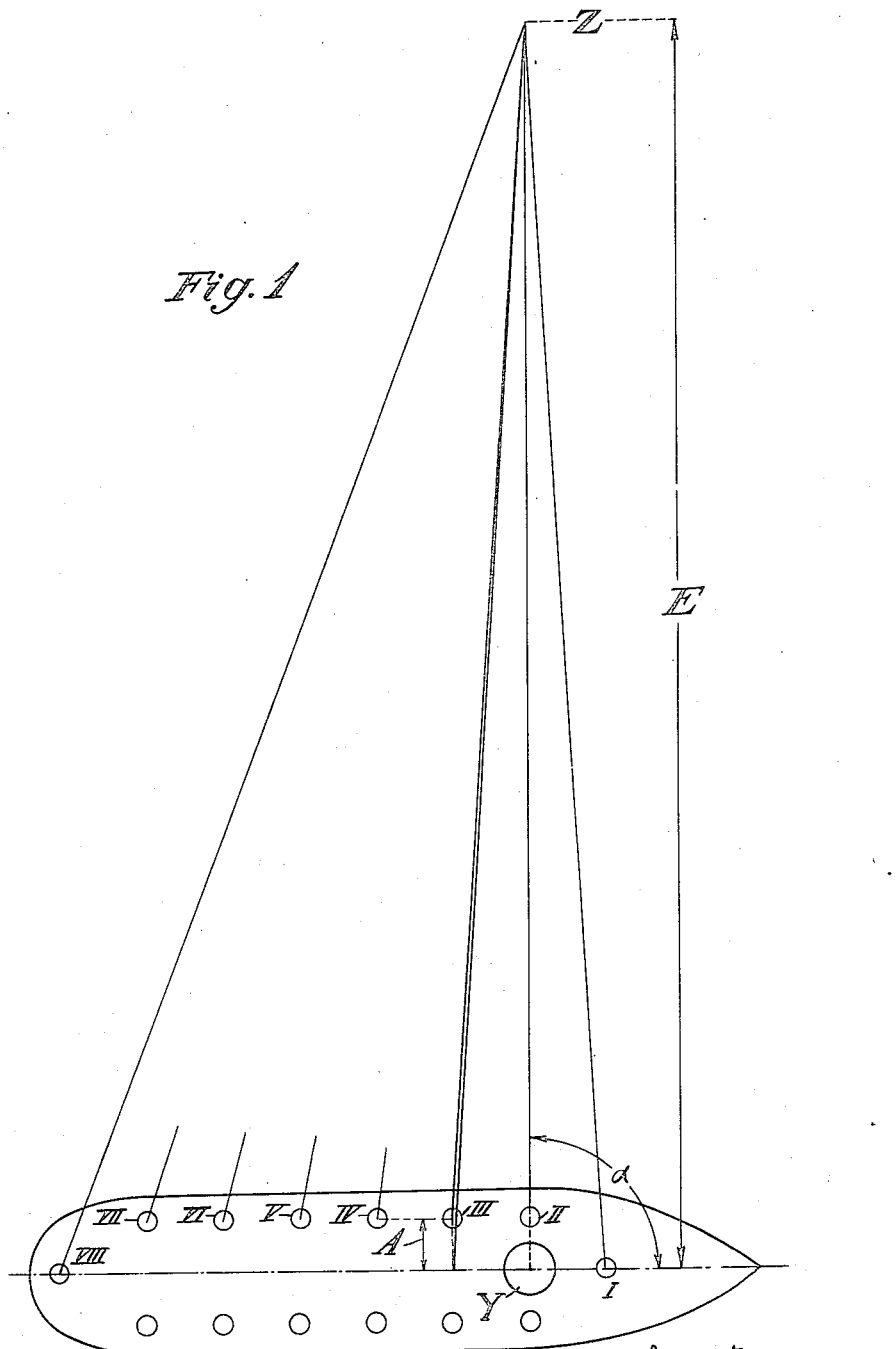

P. KAMINSKI.
SYSTEM FOR SIMULTANEOUSLY DIRECTING GUNS, SEARCHLIGHTS, OR OTHER INSTRUMENTS ON A DISTANT POINT.
APPLICATION FILED JAN. 24, 1921.

1,438,832.

Patented Dec. 12, 1922.
3 SHEETS—SHEET 1.

Inventor
Paul Kaminski
by Knight Bro
Attorneys

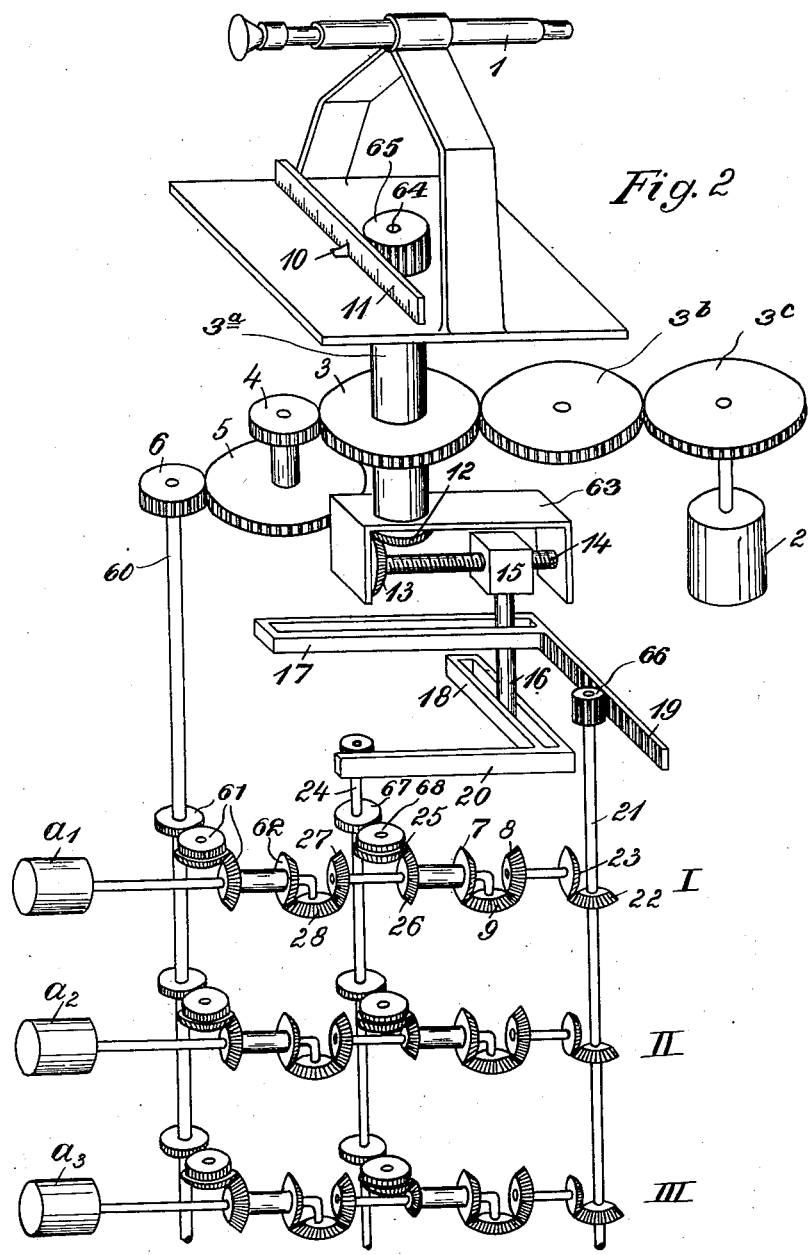

P. KAMINSKI.
SYSTEM FOR SIMULTANEOUSLY DIRECTING GUNS, SEARCHLIGHTS, OR OTHER INSTRUMENTS ON A DISTANT POINT.
APPLICATION FILED JAN. 24, 1921.
1,438,832.
Patented Dec. 12, 1922.
3 SHEETS—SHEET 3.
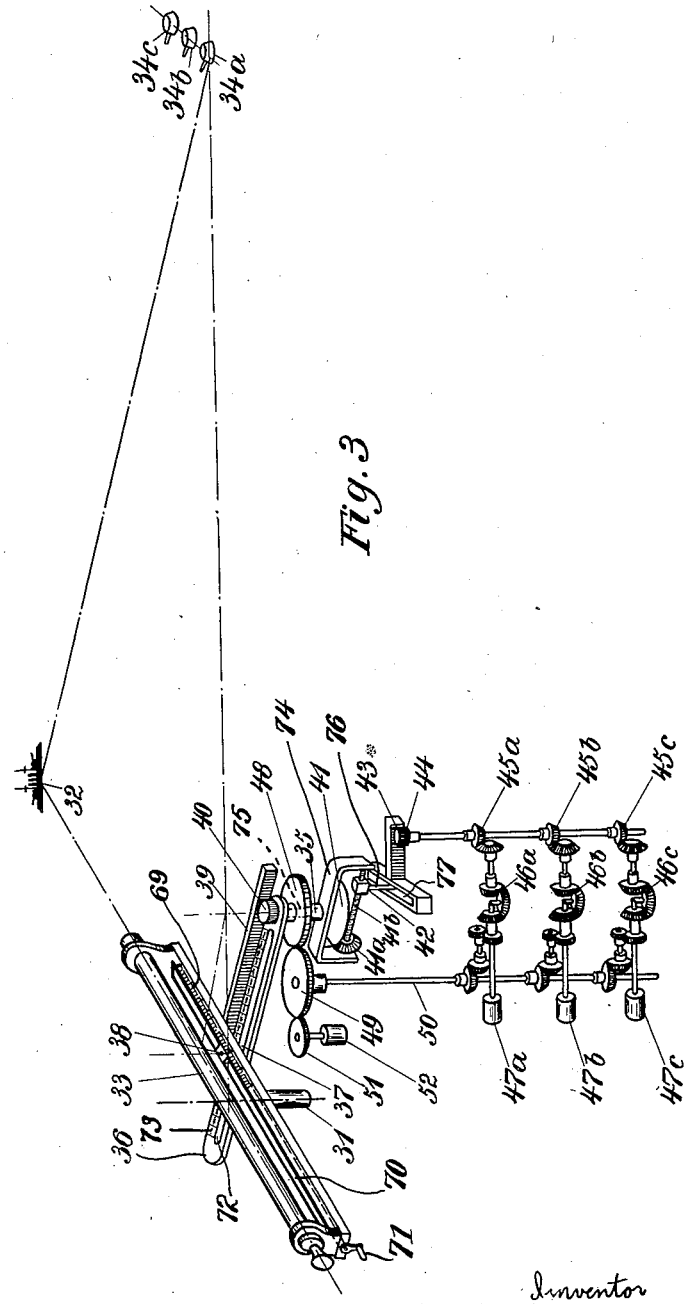

Patented Dec. 12, 1922.

1,438,832

UNITED STATES PATENT OFFICE.

PAUL KAMINSKI, OF BERLIN-PANKOW, GERMANY, ASSIGNOR TO SIEMENS & HALSKE, AKTIENGESELLSCHAFT, OF SIEMENSSTADT, NEAR BERLIN, GERMANY, A CORPORATION OF GERMANY.

SYSTEM FOR SIMULTANEOUSLY DIRECTING GUNS, SEARCHLIGHTS, OR OTHER INSTRUMENTS ON A DISTANT POINT.

Application filed January 24, 1921. Serial No. 439,649.

*To all whom it may concern:*

Be it known that I, PAUL KAMINSKI, a citizen of the German Empire, residing at Berlin-Pankow, Germany, have invented certain new and useful Improvements in Systems for Simultaneously Directing Guns, Searchlights, or Other Instruments on a Distant Point (for which I have filed applications in Germany September 18, 1916, and in Germany December 4, 1917), of which the following is a specification.

My invention refers to the simultaneous training of guns or the like on a distant point and more especially to systems of the kind aforesaid in which the concentration correction of the positions of the guns is to be considered. Its particular object is to improve the training of guns mounted on board a ship or on firm ground from a single observer's stand.

In the case of guns mounted on board a ship, the mutual distance between the different guns on the one hand, and their distance from the observer's stand, on the other hand, are comparatively insignificant as compared with the distance from the object aimed at. Nevertheless, in addition to their mutual distance the distance of the different guns from the observer's stand will have to be taken into account. To this end the lateral adjusting of the guns with regard to the object aimed at will have to be corrected with reference to the concentration correction. This correction is determined, on the one hand, by the lateral angle enclosed between the imaginary line passing through the object aimed at and the centre-line of the ship or some other straight line assumed in the place of observation and, on the other hand, by the distance of the observer's stand from the object aimed at as well as from the guns. In the case where the guns or other instruments to be trained are disposed approximately in a line either coinciding with the centre line of the ship or extending close to and in parallel to it, a correction providing for the above mentioned points will prove sufficient.

However in the case where the guns or other instruments to be trained are not arranged in line but in staggered position, not only the distance between the guns and the observer's stand along the longitudinal axis of the ship or along a straight line passing through said stand, but also their transverse distance from the observer's stand has to be taken into account.

To this end the system according to the present invention is so devised that the motive power for each transmitting device separately provided for each of the different receiving stations is derived from a driving device common to all transmitting devices and influenced by the adjusting device as well as by the device for setting the distance, the transmission being effected by means of members whose movements are influenced separately for each transmitting device by the distance between the gun or other instrument to be trained and the observer's stand in accordance with two coordinates intersecting at any desired angle in the observer's stand.

In remote control systems comprising devices for coarse and fine adjustment one revolution of the fine adjusting device corresponds to a predetermined number of divisions (e. g. 5°) of the graduation of the coarse adjusting device. If, therefore, the distance from the observer's stand of the guns to be trained is small as compared with their distance from the object aimed at then the correction to be applied to the fine-adjusting devices for the different guns is accordingly smaller than the angle corresponding to one revolution of the fine-adjusting device. In proportion as the distance of the guns from the observer's stand increases the angle of correction for the fine-adjusting devices will increase also until at least it surpasses the angle of the coarse-adjusting device which corresponds to one revolution of the fine-adjusting device. In such a case a concentration correction would have to be applied to the coarse-adjusting device also.

It is an object of my invention to obviate such inaccuracies arising in connection with larger distances existing between the observer's stand and the guns or the like to be trained, without thereby essentially complicating the system or necessitating the provision of a larger number of elements.

In order to attain this end I cause to be imparted to the transmitting device a movement, corresponding to the distance between one of the guns or other devices to be trained and the target as well as to the distance between the said gun and the observer's stand and further corresponding to the lateral angle (bearing angle), the other guns being trained in accordance with their respective distances from the target aimed at and from the first gun aforementioned as well as in accordance with the lateral angle formed with the line connecting the guns to be trained.

In the drawings affixed to this specification and forming part thereof different devices embodying my invention are illustrated diagrammatically by way of example.

In the drawings Fig. 1 is a diagram disclosing the geometrical principle underlying my invention.

Figs. 2 and 3 illustrate in a purely diagrammatical way two forms of construction.

Referring to Fig. 1, I, II, III . . . VIII are the positions of a number of guns to be simultaneously trained on the mark Z from the observer's stand Y. As far as the positions I and VIII are concerned which are located on the longitudinal axis of the vessel, consideration of the so-called longitudinal parallaxis, i. e., the correction in accordance with the distance of these guns from the mark Z and from the observer's stand Y would suffice. In contradistinction thereto the guns positioned at II to VII would show a deviation as indicated in connection with gun III by a narrow triangle. This deviation will increase in proportion as the object aimed at recedes more ahead or astern of the vessel. Therefore, the last mentioned gun positions require a special correction in acordance with the so-called transverse parallaxis whose value is determined by the formula:

$$P = \frac{A}{E} \cos a$$

wherein A is the distance of the actual gun position from the longitudinal axis of the vessel, E the distance of the object to be aimed at from the observer and $a$ the lateral angle between the line, which connects the observer's stand Y with the mark Z, and the longitudinal axis of the ship.

The operation of the device represented in Fig. 2 is as follows:

The so-called governor telescope 1 is mounted on a plate which may be trained in any desired manner e. g. by means of a hand crank with bevel gear transmission or by a hand lever and side brackets (not shown). This plate is mounted on a hollow shaft $3^a$ rotatably disposed in the apparatus casing (not shown), the said shaft carrying the gear wheel 3. Gear wheel 3 operates by suitable intermediate gears $3^b$, $3^c$, the rotor of the coarse transmitter 2 acting upon electrical receivers on the objects to be controlled in any suitable and well known manner not shown in the figure, but described for instance in my copending applications, Serial No. 468,966, filed May 12th, 1921, or Serial No. 495,290, filed August 25th, 1921. The movement of the gear wheel 3 is also transmitted by the gear transmission 4, 5 to the shaft 60 also rotatably mounted in the apparatus casing. The movement of this shaft is transmitted by gearing 61, 62 to the differential gear wheel 28 and thus the gear 28 is firstly turned for an amount corresponding to the value of the bearing angle.

I shall now describe how I effect the concentration correction. The shaft $3^a$ of the gear wheel 3 carries on its lower end a yoke 63, in which the rotatable spindle 14 is mounted. A bevel gear 13 is fixed to the spindle 14 and is in mesh with the bevel gear 12, mounted on a shaft 64, which is journalled in the center of the hollow shaft $3^a$ and carries at its upper end gear wheel 65 engaging the toothed rack 11. This rack 11 gauged for instance according to "yards of the range" may be adjusted by hand with the aid of the index 10 fixed to the plate of the governor telescope corresponding to the range ascertained by the range-finders (not shown). By this adjustment the spindle 14 is caused to turn. Spindle 14 when rotating operates screw block 15 threaded upon it and being provided with a guide pin 16 engaging the slots in the links 17 and 18. These links 17 and 18—so-called sine links—each carry a toothed rack 19 and 20 respectively disposed at right angles to the respective slots, the links being supported in the apparatus casing in such a manner (not shown) that they can slide only longitudinally of their toothed racks. If the pin 16 describes a full circle by slewing the governor telescope, the link 17 will move according to the sine-function and the link 18 according to the cosine-function of the bearing angle, while the perpendicular movement respectively is compensated by the free play of the pin 16 in the slots of the links. The actual movement of the racks 19 and 20 must be all the greater, the farther the nut 15 is moved away from the axis of the bevel gear 12. As by means of the rack 11 the distance of the target is adjusted on this bevel gear 12, it is obvious that the extent of the movement of the racks 19 and 20 is dependent upon the distance of the target and the sine or cosine respectively of the bearing angle. The movement of the rack 19 is transmitted by a gear wheel 66 to the shaft 21 rotatably mounted in the apparatus casing. From this shaft the movement is transmitted (in each case for instance of the three stations I, II, III illustrated) by the bevel gears 22, 23 and the differential gears 8, 9, to the bevel gear 27 engaging the revolving differential gear 28. The ratio of the bevel gears 22, 23 varying for each station I, II, III to be controlled corresponding to its individual distance from the governor telescope, the value of the bearing angle and the correction of the longitudinal parallaxis are transmitted to the gear 28. Corresponding to the longitudinal parallaxis the transverse parallaxis is transmitted from the shaft 24 by the gears 67, 68, 25, 26, 7, 9, 27 to the bevel gear 28 also, the ratio of the bevel gears 25, 26, corresponding to the individual distance of the stations or objects to be controlled from the center-line of the land battery or the ship.

The transmitters for fine adjustments $a_1$, $a_2$, $a_3$ act upon receivers provided on the objects to be controlled (receivers not shown) in the same manner as described above for the transmitter 2. According to the principle underlying the diagram disclosed in Fig. 1 the longitudinal and transverse parallaxes are to be taken into account in accordance with two co-ordinates extending at right angles to each other ($a$) and intersecting each other in the observer's stand. It is for this reason that the slotted guides 17, 18 in Fig. 2 are disposed at right angles to each other. They might however, be disposed as well at any other angle, if for any reason this should be preferable, as for instance, for coast batteries.

In the case, where the guns or other devices are farther distant from each other it is advisable to replace the adjusting device common to all transmitters by a special device for coarse adjustment at each transmitter.

Fig. 3 illustrates an embodiment of my invention in which the distance of the transmitting device from the guns to be trained is greater than the mutual distance of the guns. As in this case the ratio of the bevel gears corresponding to gears 22, 23, Fig. 2 for every object to be controlled should be great, it is advantageous to construct the average value of the correction for the remote objects e. g. for a levelling gun by slewing the governor-telescope, since then it is necessary only to vary the ratio of the different bevel gears corresponding to 22, 23 for the small difference between the place of an individual gun and the place of the levelling gun instead of for the great distance between the individual gun and the governor telescope. Further, in some cases it may be advantageous to put the two sine-links under some other than the right angle as I shall now describe with reference to Fig. 3.

In Fig. 3, 33 is the governor telescope rotatably mounted on pivotal axis 31. 32 is the target to be aimed at and $34^a$, $34^b$, $34^c$ are a number of guns to be trained on the target 32 by slewing the remote governor telescope 33. Image a line drawn from the axis 31 at right angles to the line connecting $34^c$ to $34^a$; then this right angle line measured from 31 to its base is the transverse parallaxis and the lines from this base to points $34^a$, $34^b$, $34^c$, respectively, are the longitudinal parallaxis to be corrected. Now, I prefer to locate the axis of rotation 35 of the transmitting device on the line connecting the axis of rotation 31 of the telescope with one of the guns selected as levelling gun e. g. $34^a$. The distance between the axis 31 and 35 and the distance between the axis 31 and the gun $34^a$ may be in any desired proportion e. g. 1:10,000 or 1:100,000. The plate of the governor telescope 33 has a slot 70 parallel to the telescope, this slot being provided with a scale 69 calibrated according to the ratio of the distance between the axis 31 and the levelling gun $34^a$ and the distance 31—35. Slidable in slot 70 is arranged the block 38 carrying at its lower end the pin 37. The block 38 is manually adjusted on the aforementioned scale by means of a crank 71 according to the distance 31—32 ascertained by range-finders (not shown here) or in any other suitable manner. The shaft of the transmitting device rotating on the axis 35 is provided with an arm 36, provided with a slot 72 engaged by the pin 37 of the block 38. As the ratio 31—38 : 31—32 is the same as 31—35 : 31—$34^a$, the arm 36 always will be parallel to the direction $34^a$—32, and therefore, the distance 35—38 will correspond to the distance $34^a$—32 i. e. the range.

The slot 72 in arm 36, therefore, is provided with a scale 73, calibrated in suitable range units which may be read from the position of the pin 37 on the scale. Fixed to the pin 37 I provide a rack 39 slidingly disposed on arm 36 and engaging pinion 40 for the purpose described hereinafter.

If the governor telescope 33 is slewed on its pivotal axle 31 the pin 37 will move in a circle and the rack 39 therefore will slide and turn pinion 40 an amount corresponding to the sine function of the angle through which the governor telescope is slewed. This arrangement, therefore, corresponds to the one of the two sine-links 17, 18 of Fig. 2.

The shaft 35 of arm 36 is rotatably mounted in the apparatus casing and carries the gear wheel 48, corresponding to the gear wheel 3 of Fig. 2, and is geared by gear 49 to shaft 50 corresponding to shaft 60 Fig. 2 and also geared by means of gear 51 to the coarse transmitter 52 corresponding to transmitter 2 in Fig. 2. The shaft 35 of arm 36 carries on its lower end a yoke 74 similar to yoke 63 in Fig. 2. The spindle $41^b$ mounted in yoke 74 is turned by the bevel gears $41^a$ and 41. The bevel gear 41 is fixed to a shaft 75 (shown in dotted lines) rotatably mounted in the hollow shaft of arm 36 and carries on its upper end the gear wheel 40 in mesh with sliding rack 39 previously mentioned. As the sliding of the rack 39 is proportional to the range, the rotation of the gear wheel 40 is similarly proportional and the nut 42 on the spindle 41$^b$ therefore will slide on it for an amount corresponding to the value of the range. The pin 76 of the nut 42 engages a slot 77 of a sine link 43, the rack of which operates by the intermediate gears 44, 45$^a$, 46$^a$; 45$^b$, 46$^b$ and 45$^c$, 46$^c$, the transmitters 47$^a$, 47$^b$, 47$^c$ respectively similar to those described above.

If in this case the slot of the sine link 43 is arranged in parallel to the center line through the battery 34$^a$—34$^c$ the rack 39 always being parallel to the direction 32, 34$^a$, all the angles in the triangle 31, 32, 34$^a$ will automatically be taken into account when operating the apparatus.

The movement of the transmitter at the central station again is transmitted in any suitable manner to the receivers on the remote guns. Obviously it is of no importance for the essential features of my invention, whether the electrical receivers transmit the data of the transmitters in a directly visible way, or on any "follow the pointer" principle, or if they directly act upon the power operation plant of the objects to be controlled. Neither is it important whether one may use one single transmitter or a plurality of transmitters for every object to be controlled, instead of the coarse and fine system described in my specification.

What I claim is:—

1. In an electrical signalling system for the tele-control of guns or the like with respect to the concentration correction, a governor telescope at a central station rotatably disposed and trainable on a target in suitable manner, at least one electrical transmitter at the central station for each gun to be controlled, said transmitters having mechanical means for operating them, which are coupled to and actuated by the slewing of said telescope, said telescope having at least one coupling pin adapted to operate all of said mechanical means, and being radially adjustable relatively to the rotation axis of said telescope and means for varying the pin radius in accordance with the target range, said mechanical means comprising sets of gears having a different ratio for each transmitter in accordance with the distance of the gun from said telescope, a pair of sine links disposed at a suitable angle to each other and interposed between said coupling pin and said mechanical means and being adjustable with respect to the angles in the triangle "telescope-target-gun" when the telescope is slewed, to cause said transmitters to suitably effect the training of the guns on the target.

2. In an electrical signalling system for the tele-control of guns or the like with respect to the concentration correction, a governor telescope at a central station rotatably disposed and trainable on a target in suitable manner, at least one electrical transmitter at the central station for each gun to be controlled, said transmitters having mechanical means for operating them, which are coupled to and actuated by the slewing of said telescope, said telescope having at least one coupling pin adapted to operate all of said mechanical means, and being radially adjustable relatively to the rotation axis of said telescope and means for varying the pin radius in accordance with the target range for any of the guns desired, said mechanical means comprising sets of gears having a different ratio for each transmitter in accordance with the distance of the gun from said telescope, a pair of sine links disposed at a suitable angle to each other and interposed between said coupling pin and said mechanical means and being adjustable with respect to the angles in the triangle "telescope-target-gun" when the telescope is slewed, to cause said transmitters to suitably effect the training of the guns on the target.

In testimony whereof I affix my signature.

PAUL KAMINSKI.